May 26, 1942.  J. W. GREIG  2,284,419
VEHICLE BODY
Filed March 20, 1939  3 Sheets-Sheet 3
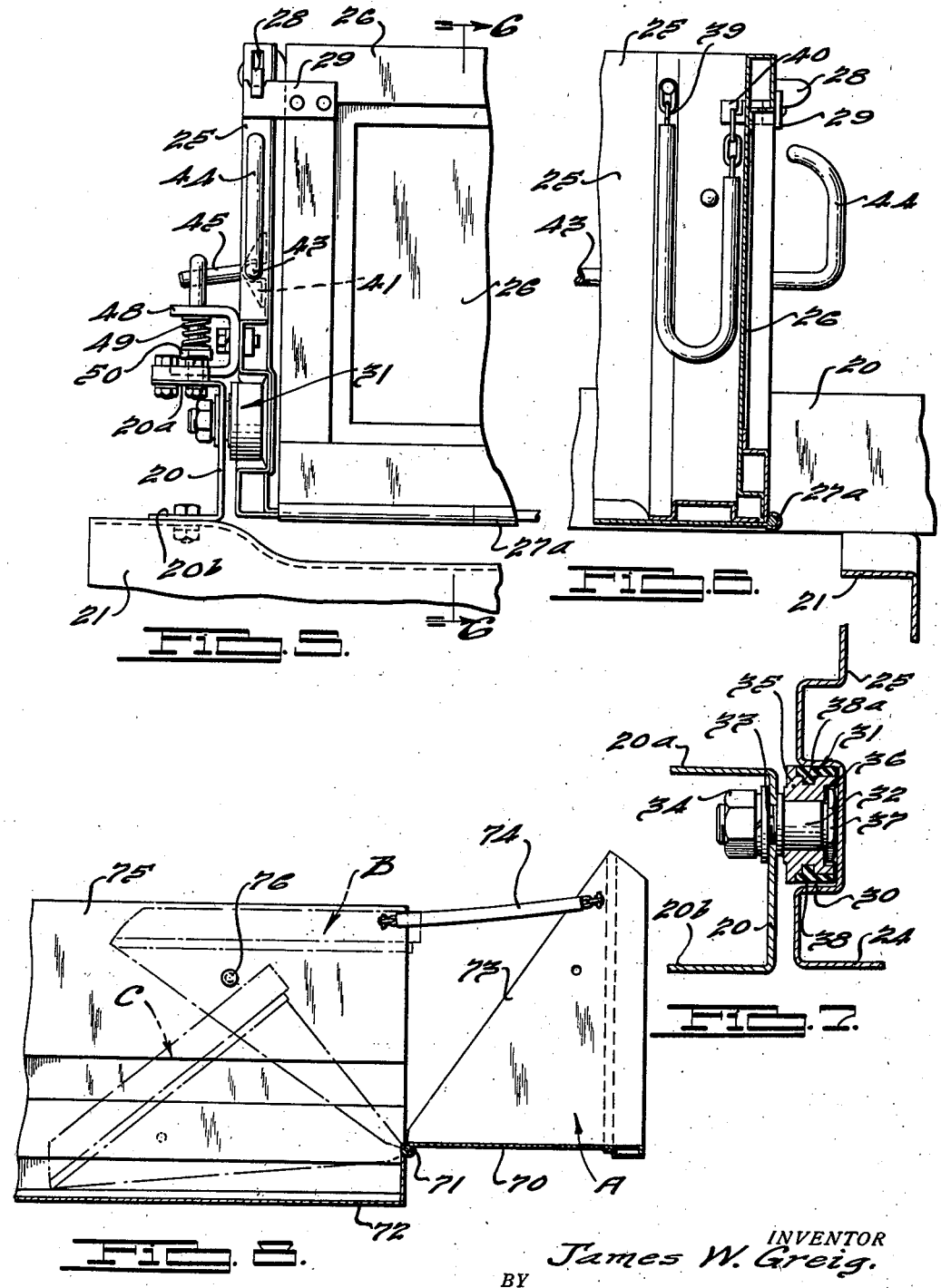
INVENTOR
James W. Greig.
BY
Dike, Calver & Gray
ATTORNEY Patented May 26, 1942

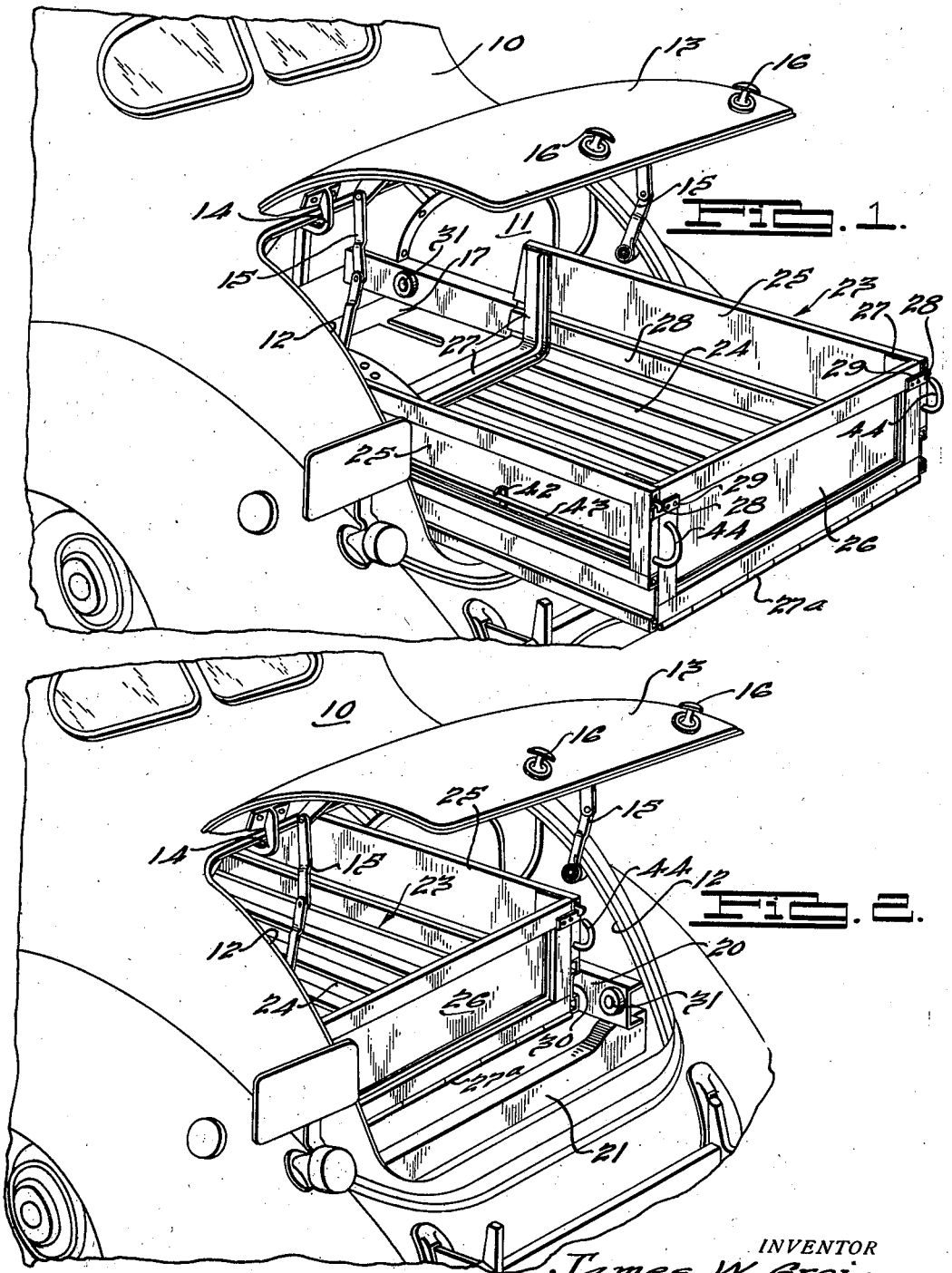

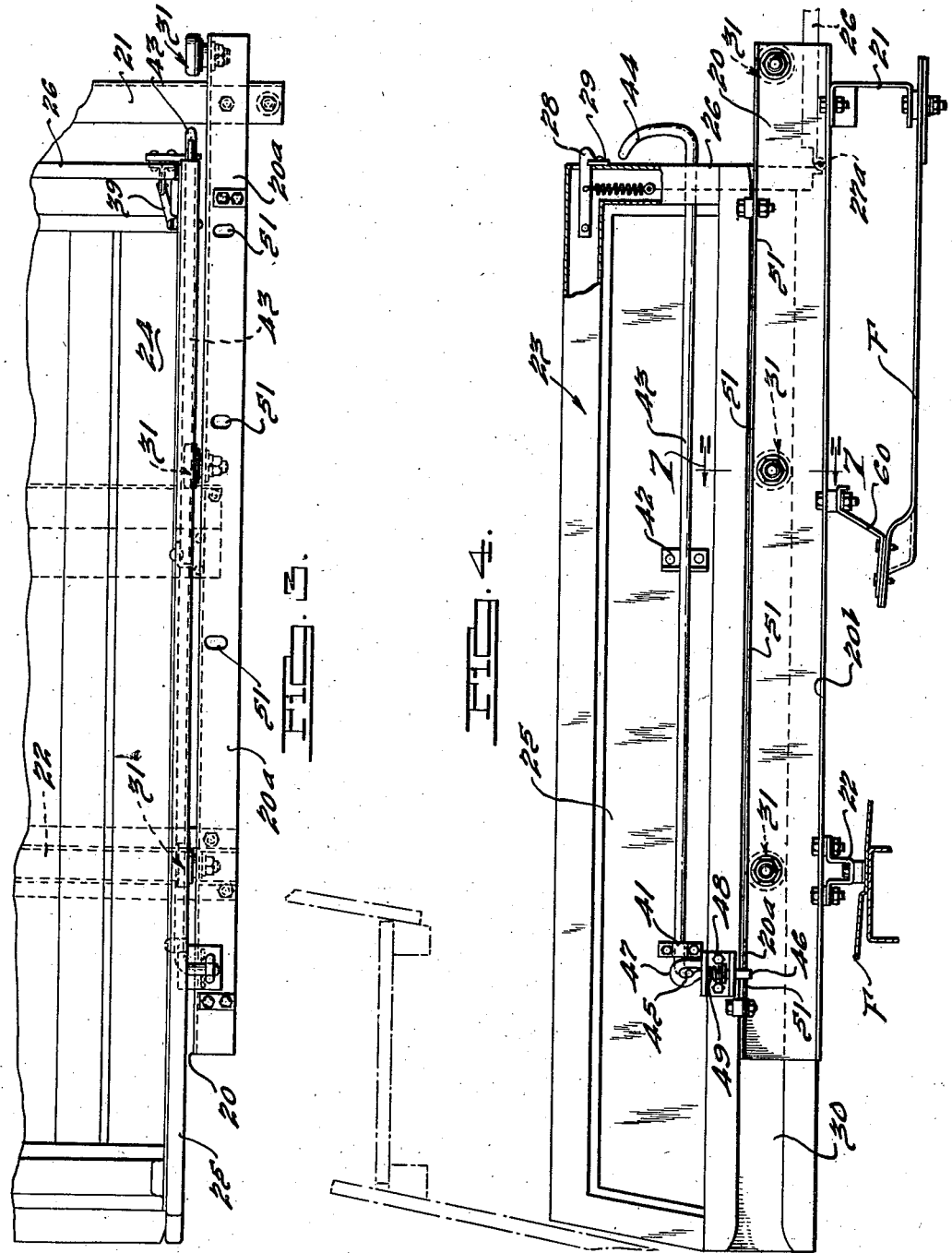

2,284,419

UNITED STATES PATENT OFFICE 2,284,419

VEHICLE BODY

James W. Greig, Grosse Pointe Park, Mich., assignor to Hudson Motor Car Company, Detroit, Mich., a corporation of Michigan Application March 20, 1939, Serial No. 262,852

3 Claims. (Cl. 296—26)

This invention relates to vehicles, particularly automobiles and the bodies thereof, of the type having a storage compartment, such as a rear deck providing a compartment in the rear of the vehicle body, said compartment having a hinged lid adapted to be raised to provide access to the compartment.

An object of the invention is to provide a vehicle of the foregoing type in which the body is provided with a box, container or the like, adapted to fit within the compartment when closed and to be shifted outwardly through the compartment opening when the lid is raised in order to increase the storage space of the compartment by providing, in effect, an extension of the compartment.

Another object of the invention is to provide a box-like unit normally concealed within a compartment of the vehicle body but capable of being shifted into position to extend outside the compartment to increase the carrying space or capacity of said compartment.

Another object of the invention is to provide unitary converting means for a vehicle body capable of being shifted into a plurality of adjusted positions to vary, at will, the size and capacity of the compartment therein, and one which is capable of being removed bodily, as a unit, from said vehicle body.

A further object is to provide unitary means of the foregoing character capable of being installed in or applied to a standard type of vehicle body without necessitating any change in and/or alteration of the body.

Another object of the present invention is to provide a unit adapted to be readily installed in the vehicle compartment which comprises longitudinal guides mounted on the floor of the compartment and a box slidable upon the guides above the compartment floor.

Another object of the invention is to provide the unit with means for releasably locking the box in its various adjusted positions and also with easily accessible controls for releasing the locking means.

A further object of the invention is to provide a unit of the foregoing type in which the movable or slidable box thereof is open at its front or inner end and is provided with a hinged wall or panel at its rear or outer end.

Another object of the present invention is to provide a vehicle body of the foregoing type which is of relatively simple and sturdy construction, and one which is comparatively inexpensive to manufacture and easy to install.

The above and other objects and advantages of the invention will appear from the following description and appended claims when considered in connection with the accompanying drawings forming a part of this specification wherein like reference characters designate corresponding parts in the several views.

In said drawings:

Fig. 1 is a fragmentary perspective view of a vehicle body of the coupé type showing one application of the present invention, in the present instance, to the rear deck or compartment of the body, the parts being shown in the open position ready for use.

Fig. 2 is a view similar to Fig. 1, showing the unit embodying the invention located entirely within the rear deck or compartment.

Fig. 3 is a partial top plan view of the unit of the preceding views.

Fig. 4 is a side elevational view, partly in section and partly broken away, showing the unit and means for mounting it upon the compartment floor, parts of the body being shown in broken lines at the left of the figure.

Fig. 5 is an enlarged fragmentary rear end elevation of the unit.

Fig. 6 is a vertical section taken substantially along the line 6—6 of Fig. 5, looking in the direction of the arrows.

Fig. 7 is an enlarged detail sectional view taken substantially along the line 7—7 of Fig. 4, looking in the direction of the arrows, and illustrating a portion of the guide means for the slidable box of the unit; and Fig. 8 is a fragmentary side elevation, on an enlarged scale, showing a modification embodying the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to Figs. 1 to 7 inclusive of the drawings, there is shown one embodiment of the present invention as applied to one type or style of vehicle body, for example to the rear deck or compartment of a coupé body. The coupé has been shown as being illustrative of only one type of body to which the present invention may be applied. It will be understood that the adjustable carrying or storage unit or box of the present invention may be adapted for uses other than in a vehicle body. For example, the unit may be applied to a building or store, being mounted upon a floor or other supporting surface thereof and being adapted to be moved or projected through a wall opening to provide additional or auxiliary supporting surface for articles to be displayed and/or stored.

In Figs. 1 and 2 there is shown the rear end of a motor vehicle having a body of the coupé type. The body includes a rear panel 10 within which is located the rear deck space or compartment 11. The panel 10 is provided with an opening 12 to permit access to the rear deck, and with a hinged closure or deck lid 13 which is adapted to close the opening. The deck lid 13, as shown, is mounted upon hinges 14, one being shown, and is adapted to be elevated into open position and supported in such position by a pair of deck lid supports 15 of any conventional type. The lid is provided with handles 16 for raising and/or lowering it and for locking it in closed position. The rear deck or compartment 11 has the usual floor or bottom 17 which, as in the present instance, may be the rear end portion or section of the floor panel of the vehicle.

It is often desirable to use a motor vehicle of the passenger or pleasure type to transport goods and supplies. With the coupé type of body the rear deck space is limited to a relatively small capacity. Thus it is difficult to transport any considerable quantity of materials or articles in such a body.

In accordance with the present invention there is provided a complete and removable, as well as an adjustable unit for application to a vehicle body, such as to the rear deck or compartment thereof for the purpose of augmenting or increasing the supporting surface or floor space of the rear deck and likewise increasing the capacity thereof. For this purpose there is provided a unit which is capable of being applied to a standard vehicle body without necessitating any change in or alteration of the body whatsoever for the purpose of accommodating the unit. Thus the unit may be applied to bodies of various styles and types without, in any way, requiring changes in the standard construction of said body.

As shown, the movable or adjustable, and removable unit of the present invention comprises a pair of longitudinally extending transversely spaced channels or members 20 which, as shown, are mounted on edge upon a transversely extending channel or frame member 21 adjacent their rear ends and upon a flanged channel member 22 located in the vicinity of the front ends thereof, see particularly Figs. 3 and 4. The members 20, 21 and 22 may be bolted together as shown so as to provide a frame structure for receiving and supporting the slidable box-like member of the unit, which latter is shown as a whole at 23. The box or storage portion of the unit, as shown, is formed of pressed metal and comprises a floor 24 which, as shown, is corrugated, side walls 25, 25 and a hinged tail gate or closure plate 26 which is secured at its lower edge by means of a hinge 27a to the box. The front end of the box is open as clearly seen in Fig. 1 and the side walls and floor are secured together and braced by spaced transversely extending brace members 27. The tail gate 26 is adapted to be held in closed position by means of releasable spring controlled latches 28 (see Fig. 4) which are carried by the side walls 25 and which engage keeper plates 29 carried by the tail gate.

As best seen in Figs. 2, 5 and 7, the metal panels forming the side walls 25 may be pressed to provide longitudinal trackways or guide channels 30 which, as shown extend the full length of the side walls 25. Each of the longitudinal channels or members 20 of the frame structure carries on its inner face or web a plurality of spaced rollers each of which is shown as a whole at 31. Each of the rollers or members, see Fig. 7, is freely rotatable, being mounted upon a stud or spindle 32 having a threaded shank 33 which extends through an opening in the web of the channel 20 and being secured to the channel by a nut 34. Each roller, as shown, comprises a body portion 35 formed of metal which is recessed or countersunk at 36 so as to receive the flat head 37 of the stud. The periphery of each roller is provided with a sleeve-like non-metallic ring 38 which may be formed of rubber or the like. As shown, the roller body portion 35 is peripherally grooved to receive and support an internal annular flange 38a formed on the rubber ring member. Thus each of the longitudinal channels 20 carries a plurality (three being shown) of freely rotatable guide and supporting rollers provided with non-metallic peripheral portions for engagement in the groove or guideway 30 of each of the side walls 25 of the box. By reason of this structure, the box can be freely moved in a longitudinal direction relative to its supporting frame members, and further by reason of the non-metallic surfaces of the rollers, metal-to-metal contact is prevented, thus permitting adjustment or movement of the box-like member in comparative silence.

It will be understood that the supporting and guiding frame structure and the adjustable box or compartment 23 may be assembled by aligning the ends of the guides or trackways 30 with the rollers 31 and then sliding the box in a substantially straight line path relative to the frame structure to engage the parts in rolling contact.

Referring particularly to Fig. 6, it will be seen that the tail gate 26 is adapted to be supported in open or substantially horizontal position by means of releasable covered chains 39 having one of their ends attached to the side walls 25 of the box and their opposite ends detachably connected to hook-like brackets or members 40 carried by the tail gate 26.

Referring now particularly to Figs. 1, 3, 4 and 5, there is shown releasable latch means or locking devices for maintaining the box in various longitudinally adjusted positions, together with operating or control means for releasing these latches or locking devices. Each of the side walls 25 of the box-like member is provided with spaced brackets 41 and 42 for supporting, in substantially horizontal position, a rod 43. The outer end of the rod, as shown, extends through a longitudinal hole or opening formed in the rear end of the wall 25 and is bent upwardly at 44 to provide a handle portion for the rod. The inner end of the rod has an offset end 45 which engages in the looped upper end 47 of a spring pressed locking pin 46. This pin, as shown, extends downwardly through a U-shaped bracket 48 which is bolted to the side wall 25. A coil spring 49 surrounds the shank of the pin and its lower end engages a stop ring or member 50 carried by the pin with its upper end in engagement with the upper leg of the U-bracket 48. Thus the tendency of the spring is to force the pin downwardly through a hole or opening in the lower leg of the U-bracket 48 and into a corresponding hole 51 formed in the top flange 20a of the channel 20.

As seen in Figs. 3 and 4, a series of holes or slots 51 is provided in the flange 20a, these slots being longitudinally spaced throughout the length of the flange. When it is desired to adjust the box longitudinally relative to its supporting structure, the handle 44 is grasped and turned in a direction to rotate the rod 43 and withdraw the pin 46, against the action of the spring 49, from the hole or slot 51 in the channel flange 20a. It will be understood that both handles 44 are operated at the same time to release both of the locking pins. By grasping both handles with both hands and turning the handles in a downward direction or inwardly toward one another, the pins will be released, thereby releasing the box and permitting it to be moved from one position over the guide rolls and supporting frame to a new adjusted position, in which latter position the handles are released and the pins engaged with newly located slots 51 in the channel flanges 20a to lock the box to the frame structure.

As seen in Fig. 4, additional supports or braces 60 may be provided and attached to the bottom flanges 20b of the longitudinal channels 20, which braces, in turn, may be attached, by screws or the like, to the floor panel F of the vehicle. It will also be seen from an examination of this figure that the transverse members 21 and 22 of the supporting frame structure of the unit may be secured by bolts or the like to the floor structure F.

It is a relatively simple matter to install the unit in the rear deck or compartment of the body and it may be entirely removed therefrom by simply releasing the means which support it in position upon the floor. At the left side of Fig. 4 there is shown, in broken lines, some of the frame structure or elements of the vehicle body to illustrate the relative positions of the removable and adjustable "pick-up" unit and certain standard or fixed parts of the body structure.

A somewhat modified form of the present invention is shown in Fig. 8. In some instances it may be desirable, when the slidable "pick-up" box of the unit is in its fully extended position projecting through the opening 12 of the rear deck, to provide additional supporting surface or an extension for supporting and transporting relatively long objects or articles such, for example, as a plurality of metal pipes, strip steel or bars and the like. It is also desirable to prevent such articles, which may be transported in loose or unbound condition, from shifting or spreading laterally or "fanning out" transversely beyond the side walls of the vehicle body. To take care of such problems, I have provided an improved tail gate structure which, as shown, includes a transverse end wall or portion 70 hinged at 71 to the box-like member 72. The closure or tail gate 70, as shown, is provided with substantially triangular end pieces or flanges 73 which, when the member 70 is supported in its open or horizontal position as shown at A by the detachable chains 74, will serve as stops or barriers to prevent the outer end portions of any loose pipes, bars or the like from slipping or moving laterally beyond the side walls 75 of the box-like structure. The tail gate of this form of the invention is shown in its open position for use at A, in its closed position at B and in a lowered position within the box at C. In its intermediate or closed position B, the tail gate is held from assuming its lowered position at C by movable preferably spring pressed pins 76 one of which is carried by each of the side walls 75 and normally projects inwardly to engage holes or openings formed in the end members or flanges 73 of the tail gate. In all other respects the box-like structure of the present form of the invention is generally like that of the preceding form.

From the foregoing it will be seen that I have provided a complete unit adapted to be mounted upon the floor of a vehicle or other structure without necessitating any reorganization or alteration or change in the floor structure or other standard parts of the body and which unit is freely adjustable to provide an extension of the floor structure of the vehicle compartment to thus increase the capacity thereof, thereby permitting commercial use of a standard passenger or pleasure vehicle.

I claim:

1. A portable unit adapted for installation upon the floor of a rear deck compartment in the body of a vehicle in which said rear deck compartment has an opening and a single movable closure member for completely closing said opening, said unit comprising a removable supporting frame and guide structure composed of a pair of transversely spaced channel-shaped members extending longitudinally of the body within said compartment and a channel-shaped frame member extending transversely of said body connected to and disposed below the rear end portions of said longitudinally extending channel-shaped members to support the latter and maintain them in predetermined spaced relation, a metallic box-like structure having a corrugated bottom slidably mounted upon said frame, and cooperating guide means forming a part of said frame and metallic box-like structure for guiding the box-like structure in a substantially straight line path relatively to said frame and rear deck compartment, said guide means comprising channel-like guideways formed from the metal of the upright side walls of said box-like structure and freely rotatable rollers on the longitudinal channel-shaped members of said supporting frame.

2. In a convertible vehicle body having a rear deck compartment provided with a floor, an opening and a single closure member for completely closing said opening, the combination of a removable unit located within said compartment and having a box-like member adapted to be projected through said opening when the closure member is in elevated position to increase the capacity of said compartment, said unit comprising a supporting structure having transversely spaced members extending longitudinally of the body and a channel shaped member extending transversely of the body attached at its opposite ends to said longitudinally extending members for maintaining the latter in predetermined spaced relation, a pressed metal box-like member having a corrugated bottom forming a part of said unit movable on and relative to said supporting structure, and interfitting guide means comprising rollers carried by the supporting structure adjacent the upper surface thereof and integral trackways formed from the metal of the side walls of said pressed metal box-like member independently of the vehicle body for guiding said box-like member during its movements through the compartment opening.

3. In a convertible vehicle body having a rear deck compartment provided with a floor, an opening and a single closure member for completely closing said opening, the combination of a removable unit located within said compartment and having a portion thereof adapted to be projected through said opening when the closure member is in elevated position to increase the capacity of said compartment in which the removable unit is provided with releasable locking means for maintaining a member thereof in various adjusted positions with relation to the remainder of said unit, said unit comprising a supporting structure having transversely spaced channel-shaped members extending longitudinally of the body and a channel-shaped member extending transversely of the body attached at its opposite ends to said longitudinally extending members for maintaining the latter in predetermined spaced relation, a pressed metal box-like member forming a part of said unit movable on and relative to said supporting structure, and interfitting guide means comprising rollers having rubber covered peripheral portions carried by the supporting structure and integral trackways formed from the metal of the side walls of said pressed metal box-like member independently of the vehicle body for guiding said box-like member during its movements through the compartment opening.

JAMES W. GREIG.